United States Patent [19]

Yamamoto

[11] Patent Number: 4,633,457
[45] Date of Patent: Dec. 30, 1986

[54] OPTICAL INFORMATION READING APPARATUS

[75] Inventor: Kimiaki Yamamoto, Hachiouji, Japan

[73] Assignee: Olympus Optical Co., Ltd., Tokyo, Japan

[21] Appl. No.: 622,395

[22] Filed: Jun. 20, 1984

Related U.S. Application Data

[63] Continuation of Ser. No. 334,364, Dec. 24, 1981, abandoned.

[30] Foreign Application Priority Data

Dec. 27, 1980 [JP] Japan .................. 55-188794

[51] Int. Cl.⁴ .................. G11B 7/125; G11B 7/18
[52] U.S. Cl. .................. 369/116; 369/118; 369/122
[58] Field of Search .................. 350/162.11; 346/762, 346/108; 358/342; 250/162.11; 369/44, 45, 46, 100, 109, 111, 112, 116, 118, 275, 121, 122, 117

[56] References Cited

U.S. PATENT DOCUMENTS

| 3,913,076 | 10/1975 | Lehureau et al. | 369/118 X |
| 4,006,293 | 2/1977 | Bouwhuis et al. | 369/46 X |
| 4,125,859 | 11/1978 | Oshida et al. | 369/111 |
| 4,142,210 | 2/1979 | Otobe et al. | 365/215 X |
| 4,198,701 | 4/1980 | Reddersen et al. | 369/44 X |
| 4,209,793 | 6/1983 | Ueno | 369/118 X |
| 4,235,507 | 11/1980 | Kataoka et al. | 369/112 |
| 4,310,910 | 1/1982 | Sheng | 369/121 |
| 4,325,135 | 4/1982 | Dil et al. | 369/122 |
| 4,375,096 | 2/1983 | Gorog et al. | 369/116 X |

FOREIGN PATENT DOCUMENTS 106414 8/1980 Japan .

Primary Examiner—Donald McElheny, Jr.
Attorney, Agent, or Firm—Cushman, Darby & Cushman

[57] ABSTRACT

An optical information reading apparatus wherein the intensity distribution of a light beam projected onto a video disk through an objective optical system is so made that the intensity in the direction along an information track is larger than the intensity in the direction intersecting at right angles with the information track in order to improve S/N and to eliminate cross-talks.

2 Claims, 3 Drawing Figures

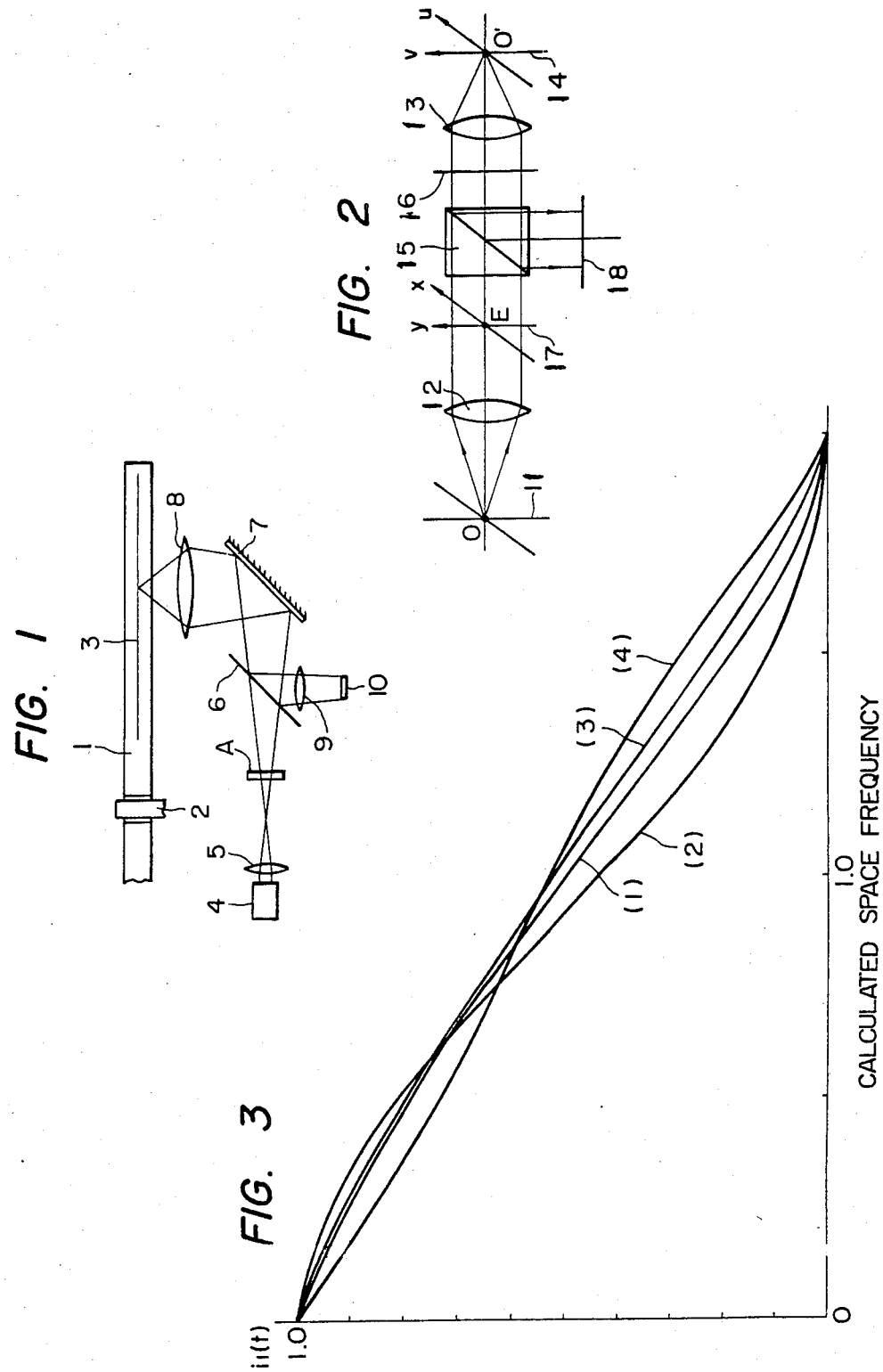

OPTICAL INFORMATION READING APPARATUS

This is a continuation of application Ser. No. 334,364 filed Dec. 24, 1981, now abandoned.

BACKGROUND OF THE INVENTION (a) Field of the Invention

This invention relates to an optical information reading apparatus to be used in a video disk system in which cross-talks are decreased and S/N of read signals is improved.

(b) Description of the Prior Art

There is known an optical information reading apparatus wherein a beam radiated from a light source and collected is projected onto a recording medium having a track including recorded information and a plurality of detectors are arranged so as to receive a light pencil modulated by the recorded information. There is known, for example, such optical information reading apparatus wherein information is read by focusing a reading light spot through an objective on an information track arranged spirally or concentrically circularly on a recording medium. There is a recording medium having an information track and called, for example, a video disk, audio disk or data disk. In such disk, coded video signals, audio signals or data signals are recorded in the information track as optical information which can be represented by an optical transmission characteristic, reflection characteristic or phase characteristic. The information recorded in such disk is read by focusing through an objective on the information track a laser light radiated from a laser light source while the disk is rotated at a high speed and detecting a transmitted light or reflected light modulated by the information track. One of the features of such recording medium is that the information recording density is very high. Therefore, the width of each information track is very narrow and the spacing between the successive information tracks is also very narrow. In order to accurately read the original information from the information track thus narrow in both width and pitch, it is necessary to always accurately project on the track of the disk a beam spot focused by the objective. However, as the relative positions of the disk and objective fluctuate, the spot can not always be held on the track. Therefore, such optical reading apparatus is controlled by a servomechanism whereby the position lag of the beam spot from the information track is detected and the spot is displaced in the direction at right angles with the information track and the optical axis of the objective and the optical axis direction of the objective on the basis of this position lag signal.

FIG. 1 shows the optical system of the above described disk reading apparatus. A disk 1 is rotated at a speed, for example, of 1800 revolutions per minute by a spindle 2. A concentric circular or spiral track 3 is recorded on the disk 1. Such light as a laser light radiated out of a light source 4 is focused by a lens 5, λ/4 plate A, half mirror 6, reflecting mirror 7 and objective 8 and is projected as a spot on the track 3 of the disk 1. The light reflected by the disk 1 is collected by the objective 8 and the light reflected by the reflecting mirror 7 and half mirror 6 is made to enter the light receiving device 10 through a lens 9. In the apparatus shown in FIG. 1, the light receiving device 10 is positioned in the far field zone of the information track 3. That is to say, the light receiving device 10 is arranged at the position well away from the image of the pit structure formed by the objective 8 so that the diffracted beams of various orders formed by the pit structure of the information track can be detected as separated.

Further, there is also known an optical information reading apparatus wherein the light receiving device 10 is arranged at the position in which the image of the pit is formed by the objective 8.

Among the factors deteriorating the picture quality in such optical video disk system are S/N of a read signal and a cross-talk. In case information is being recorded with a spatially high frequency as in a portion near the center of a disk or an information track portion smaller in the diameter, the signal to be read will be so small that the former will be particularly a problem. Further, it is known that particularly, in the case of reproducing information in a CLV type video disk system, the latter will have a great influence on the picture quality.

SUMMARY OF THE INVENTION

An object of the present invention is to provide such optical information reading apparatus as can improve the S/N in a zone in which information is recorded at a high frequency and can eliminate cross-talks.

According to the present invention, this object is attained by so making the intensity distribution of a light beam projected onto an information recording carrier that the intensity in the direction along an information track is larger than the intensity in the direction intersecting at right angles with the information track.

According to a preferred formation of the present invention, such optical filter as is different in the transmission factor characteristic in the direction along an information track and in the direction intersecting at right angles with the information track is arranged in an optical system for reading information. Thereby, the object can be very simply attained without particularly raising the manufacturing cost.

This and other objects of the present invention will become more apparent during the course of the following detailed description and appended claims.

BRIEF DESCRIPTION OF THE DRAWINGS

FIG. 1 is a view showing an optical system to be used in the apparatus according to the present invention;

FIG. 2 is a formation view of an embodiment of an optical information reading apparatus according to the present invention; and FIG. 3 is a diagram showing frequency characteristics of detected signals in case optical filters are used.

DESCRIPTION OF THE PREFERRED EMBODIMENT

In FIG. 2 showing abstractly the optical system part of FIG. 1, the reference numeral 11 denotes a light source, 22 denotes a collimator lens, 13 denotes an objective, 14 denotes a disk having an information track, 15 denotes a polarizing prism, 16 denotes a ¼ wavelength plate, 17 denotes an entrance pupil position of the objective 13 and 18 denotes a detector.

Now, coordinates $\mu$ and $\nu$ having the direction along the track as a $\mu$ direction are taken as coordinates on the disk 14 and are represented in diffraction units. Coordinates on the pupil 17 are made x and y and the maximum pupil radius is so normalized as to be 1. In such optical system, if an optical filter of a transmission coefficient $T(x, y)$ is placed in the pupil position 17, a light from the light source 11 passes through this filter, is then diffracted and reflected by a disk having a reflection factor of a periodic structure, is reflected by the polarizing prism 15 and is injected into the detector 18 and the entire light pencil is received, the signal i(t) detected by the detector at this time will be represented by the following formula (1):

$$i(t) = \sum_m \sum_n \sum_{m'} \sum_{n'} R(m,n) R^*(m',n') H(m,n;m',n') e^{2\pi i(m'-m)a\omega\mu t} \quad (1)$$

$$H(m,n;m',n') = \iint_{x^2+y^2 \leq 1} f(x - m\mu, y - n\nu) T(x - m\mu, y - n\nu)$$

$$f^*(x - m'\mu, y - n'\nu) T^*(x' - m'\mu, y - n'\nu) dx dy \quad (2)$$

wherein $\mu$, $\nu$ and R(m, n) represent respectively period in the track direction and radial direction of the transmission coefficient and a Fourier coefficient of the disk, f(x, y) represents a product of the amplitude distribution of the light incident upon the pupil face and the pupil function of the objective, $\omega$ and a represent respectively an angular velocity and a radius in the reading position of the disk and
*represents a complex conjugation.

According to the formula (1), the signal detected by the detector is understood to be formed of beats of a spectrum among which the fundamental frequency component $i_l(t)$ of $m' - m = 1$ is frequency-modulated to be a video signal component.

FIG. 2 shows frequency characteristics of $i_1(t)$ in case the objective has no aberration, the intensity of the injected beam is uniform and optical filters in which the transmission coefficients are respectively (1) $T(x, y)=1$, (2) $T(x, y)=e^{-(x^2+y^2)}$, (3) $T(x, y)=e^{-y^2}$, (4) $T(x, y)=0-.6e^{(0.5x^2-y^2)}$ are used. In this calculation, it is assumed that the cross-sectional shape of the pit is rectangular, the width is 0.32, the duty ratio is 0.5 and the track distance is of a spacial frequency of 0.94.

As clear from this diagram, it is found that, as the filter (for example, of (3) or (4) in which the transmission factor in the track direction (x direction) is larger than the transmission factor in the direction (y direction) intersecting at right angles with the track direction is used in a position separated from the optical axis of the objective, the responding characteristic of the high frequency zone will increase. Therefore, if such filter is used, S/N of the high frequency zone which is most problematical in S/N will be able to be improved.

The cross-talks when the spacial frequency is 0 and 0.5 with the four filters are calculated as in the following Tables 1 and 2.

TABLE 1

| Spacial frequency | Filter | | | |
|---|---|---|---|---|
| | (1) | (2) | (3) | (4) |
| 0 | −27db | −37db | −31db | −28db |
| 0.5 | −40db | −53db | −60db | −50db |

TABLE 2

| Spacial frequency | Filter | | | |
|---|---|---|---|---|
| | (1) | (2) | (3) | (4) |
| 0 | −31db | −40db | −36db | −33db |
| 0.5 | −45db | −54db | −66db | −53db |

By the way, in these tables, the track distance corrsponds to 0.8 and 1 and the pit width is made 0.32.

It is found from Tables 1 and 2 that the cross-talks will decrease to be less in case the filters (2), (3) and (4) are used than in case no filter is used (1). Therefore, it is found that such filter in which the transmission factor decreases with respect to the direction (y direction) intersecting at right angles with the track has also an effect of decreasing cross-talks. This is thought to be because the cross-talks so greatly depend on the side lobe of the intensity of the point image condensed on the disk that the filters of the characteristics of (2), (3) and (4) have an effect of decreasing the side lobe in the $\nu$ direction.

As clear from the above characteristics shown in FIG. 2 and values in Tables 1 and 2, it is found that such optical filter in which the transmission factor in the track direction is larger than the transmission factor in the direction intersecting at right angles with the track direction is much more effective to increase the response of the high frequency zone and to decrease cross-talks than a symmetrical type optical filter in which the transmission factor is low in both directions.

The above explanation has been made on an optical system in which a filter is arranged to decrease cross-talks and improve S/N. However, in case a semiconductor laser is used as a light source, as the semiconductor laser separates from the optical axis, the intensity will decrease and the rate of decrease will be different in the two directions intersecting at right angles with each other. Therefore, if the semiconductor laser light source is so arranged that the direction in which the decrease of the intensity is larger may be the direction intersecting at right angles with the track, the same effect as in the case of using the optical filter will be obtained.

Further, in the explanation, the entrance pupil position of the objective is set as the position of placing the optical filter. However, in the case of an optical system utilizing only such ray as is considered to be substantially an axial ray, wherever it is placed in the going course, the same effect as is described above will be obtained.

I claim:

1. In an optical information reading apparatus comprising a light source, a collimator lens for making light rays from said light source parallel, an objective for collecting said parallel light rays on a disk having thereon an information track, a condenser lens for collecting reflected light rays from said disk, and a detector for detecting the light rays collected by said condenser lens, an improvement comprises a filter arranged between said collimator lens and objective and having a transmission factor larger in the direction along said track than that in the direction intersecting at right angles with said track to arrange so that the light intensity distribution in the direction along said track of a beam spot to be formed on said disk by collecting said parallel light rays through said objective is larger than that in the direction intersecting at right angles with said track.

2. In an optical information reading apparatus comprising a light source, a collimator lens for making light rays from said light source parallel, an objective for collecting said light rays on a disk having thereon an information track, a condensor lens for collecting reflected light rays from said disk and a detector for detecting the light rays collected by said condenser lens, an improvement comprising a semiconductor laser to be used as said light source arranged so that the direction in which the decay rate of the intensity of a beam issued from said semiconductor laser is smaller, coincides with the direction intersecting at right angles with said track to arrange so that the light intensity distribution in the direction along said track of a beam spot to be formed on said disk is larger than that in the direction intersecting at right angles with said track.

* * * * *